(12) United States Patent
Scheffler et al.

(10) Patent No.: US 9,433,148 B2
(45) Date of Patent: Sep. 6, 2016

(54) DEVICE FOR COLLECTING AND RELEASING DEBRIS

(71) Applicant: Schiller Grounds Care, Inc., Southampton, PA (US)

(72) Inventors: Ronald Scheffler, Beaver Dam, WI (US); Randy Hilgart, Cottage Grove, WI (US); Anthony S. Weber, Lake Mills, WI (US); Guillaume Labbe, Thetford Mines (CA); Remi Poulin, Adstock (CA)

(73) Assignee: Schiller Grounds Care, Inc., Southampton, PA (US)

( * ) Notice: Subject to any disclaimer, the term of this patent is extended or adjusted under 35 U.S.C. 154(b) by 0 days.

(21) Appl. No.: 14/184,897

(22) Filed: Feb. 20, 2014

(65) Prior Publication Data

US 2015/0230404 A1     Aug. 20, 2015

(51) Int. Cl.
*A01D 43/063*     (2006.01)

(52) U.S. Cl.
CPC ................... *A01D 43/0635* (2013.01)

(58) Field of Classification Search
CPC .......... A01D 43/063; A01D 43/0631; A01D 43/0635; B60J 7/10; B65F 3/001
USPC .................... 56/202, 203, 205, 206
See application file for complete search history.

(56) References Cited

U.S. PATENT DOCUMENTS

| | | |
|---|---|---|
| 3,135,080 A | 6/1964 | Christiansen |
| 4,476,668 A | 10/1984 | Reilly |
| 4,487,007 A | 12/1984 | Mullet et al. |
| 4,523,788 A | 6/1985 | Prasad |
| 4,532,756 A * | 8/1985 | Merkel ............... 56/202 |
| 4,569,187 A | 2/1986 | Spiker et al. |
| 4,709,541 A | 12/1987 | Broman et al. |
| 4,903,467 A | 2/1990 | Wolf |
| 4,922,696 A | 5/1990 | Burns et al. |
| 4,972,666 A * | 11/1990 | Peruzzo ............... 56/206 |
| 4,984,420 A | 1/1991 | Samejima et al. |
| 4,989,917 A | 2/1991 | Schmidt, Jr. |
| 5,018,346 A | 5/1991 | Ishimaru et al. |
| 5,069,293 A | 12/1991 | St. Romain |
| 5,080,442 A | 1/1992 | Doering et al. |
| 5,107,661 A | 4/1992 | Shimamura |
| 5,193,882 A | 3/1993 | Gamaldi |
| 5,307,613 A | 5/1994 | Delery |
| 5,473,875 A | 12/1995 | Fava et al. |
| 5,778,648 A | 7/1998 | Parkes et al. |
| 5,870,889 A | 2/1999 | Togoshi et al. |
| 5,921,073 A * | 7/1999 | Cash ............... 56/202 |

(Continued)

*Primary Examiner* — Alicia Torres
*Assistant Examiner* — Adam Behrens
(74) *Attorney, Agent, or Firm* — Panitch Schwarze Belisario & Nadel LLP (57) ABSTRACT

A device comprises a collection bin and a stationary front plate pivotably coupled with the bin via a hinge mechanism. The bin is rotatable relative to the front plate between a first position, wherein the bin's front end is closed by the front plate, and a second position, wherein the front end is spaced from the front plate for releasing debris out of the bin. An actuator is operatively connected to the hinge mechanism, which includes a bar interconnected between the bin and front plate. The bar is attached to the front plate and the bin. Actuator actuation rotates the bar and the bin in an arcuate motion from the first to the second position, and retraction of the actuator returns the bar and bin to the first position. Rotation of the bin defines a center of rotation on the opposite side of the front plate from the bin.

8 Claims, 8 Drawing Sheets

(56) References Cited

U.S. PATENT DOCUMENTS

| | | | |
|---|---|---|---|
| 6,012,273 A | 1/2000 | Ogasawara et al. | |
| 6,029,312 A | 2/2000 | Whitney | |
| 6,050,072 A * | 4/2000 | Chabrier et al. | 56/202 |
| 6,089,006 A | 7/2000 | Langford et al. | |
| 6,226,970 B1 | 5/2001 | Busboom et al. | |
| 6,513,312 B1 | 2/2003 | Ishimori et al. | |
| 6,584,757 B2 | 7/2003 | Komorida et al. | |
| 6,591,596 B2 | 7/2003 | Mauzizio et al. | |
| 6,595,737 B1 * | 7/2003 | Parish | 414/519 |
| 6,672,043 B2 | 1/2004 | Shibata et al. | |
| 6,688,091 B2 | 2/2004 | Ishimori | |
| 6,766,633 B2 | 7/2004 | Wanie et al. | |
| 6,840,029 B2 | 1/2005 | Ishimori | |
| 6,931,827 B2 | 8/2005 | Komorida et al. | |
| 7,047,718 B2 | 5/2006 | Caroni | |
| 7,124,563 B2 | 10/2006 | Shibata et al. | |
| 7,194,850 B2 * | 3/2007 | Asahara et al. | 56/202 |
| 7,219,489 B2 | 5/2007 | Tada et al. | |
| 7,240,472 B2 | 7/2007 | Evers | |
| 7,263,819 B2 | 9/2007 | Samejima et al. | |
| 7,325,389 B2 | 2/2008 | Walker | |
| 7,430,848 B2 | 10/2008 | Suhara et al. | |
| 7,448,192 B2 | 11/2008 | Umemoto et al. | |
| 7,565,790 B2 | 7/2009 | Uemura et al. | |
| 7,594,378 B2 | 9/2009 | Asahara et al. | |
| 7,617,663 B1 * | 11/2009 | Walton et al. | 56/202 |
| 7,637,089 B2 | 12/2009 | Yamashita et al. | |
| 7,730,706 B2 | 6/2010 | Ogata et al. | |
| 7,905,080 B2 | 3/2011 | Uemura et al. | |
| 7,992,373 B2 | 8/2011 | Ogata et al. | |
| 8,006,473 B2 | 8/2011 | Kuramoto et al. | |
| 8,033,086 B2 | 10/2011 | Fukumoto et al. | |
| 8,122,695 B2 | 2/2012 | Suhara | |
| 2002/0083696 A1 | 7/2002 | Komorida et al. | |
| 2004/0079063 A1 | 4/2004 | Ishimori | |
| 2004/0112027 A1 | 6/2004 | Komorida et al. | |
| 2005/0005587 A1 * | 1/2005 | Suhara et al. | 56/14.7 |
| 2005/0172599 A1 | 8/2005 | Burcham et al. | |
| 2005/0229571 A1 | 10/2005 | Satoski | |
| 2005/0284120 A1 * | 12/2005 | Tada et al. | 56/202 |
| 2006/0272309 A1 | 12/2006 | Moore | |
| 2007/0056259 A1 * | 3/2007 | Uemura et al. | 56/202 |
| 2009/0126328 A1 | 5/2009 | Shimizu | |
| 2009/0320433 A1 * | 12/2009 | Kuramoto et al. | 56/202 |
| 2010/0064649 A1 | 3/2010 | Harada et al. | |
| 2010/0095643 A1 * | 4/2010 | Keene et al. | 56/10.1 |

\* cited by examiner

DEVICE FOR COLLECTING AND RELEASING DEBRIS

BACKGROUND OF THE INVENTION

The present invention relates generally to a device for collecting and releasing debris and, more particularly, to a collection device for collecting and releasing grass clippings, leaves and similar lawn and garden debris.

Riding lawn mowers are generally well known in the art. Conventional riding lawn mowers typically include a mower deck enclosing rotating blades for cutting grass, wheels and a motor for steering and propelling the mower, a seat for the user atop the mower deck, controls to at least navigate the mower, and a collection bin generally located behind the seat for receiving and collecting the debris, e.g., grass and leaf clippings and the like which are lifted by the action of the blades. The collection bin is generally selectively movable between a first position that temporarily holds the grass and leaf clippings produced by the mower and a second position that dumps the grass and leaf clippings produced by the mower. An objective of the riding lawn mower is to facilitate and expedite the lawn mowing process for users.

One drawback of conventional riding lawn mowers pertains to the assembly, and thus the functionality, of the collection bins. Rotation of a collection bin between the first and second positions requires a generally large amount of clearance space behind the collection bin to allow the collection bin to rotate between the first and second positions without any interference. The required clearance space therefore limits where the grass and leaf debris can be dumped. Moreover, as the radius of rotation of a collection bin increases so does the area of the debris pile, resulting in a larger, more spread out, more unsightly debris pile.

Another drawback of some conventional riding lawn mowers pertains to the unloading of the collection bins. Generally, the collection bins are manually unloaded. That is, a user must, at a minimum, turn around in their seat and manually pivot the collection bin up and away from the underlying ground surface to release the debris within the collection bin. This can be difficult, e.g., too heavy, for a user, especially as more debris accumulates within a collection bin, and detracts from the objective of the riding lawn mower to facilitate the lawn mowing process. In some cases, depending on the amount of debris within a collection bin, some users may even need to step off of the lawn mower in order to manually unload the collection bin.

Accordingly, it would be advantageous to have a device for collecting and releasing debris, usable with a riding lawn mower, that has a compact arcuate motion between the first, or collection, position, and the second, or dumping, position, in order to require less clearance space behind the device and also to form more compact debris piles. It would also be advantageous to have a device for collecting and releasing debris having an actuator that facilitates unloading of the device.

BRIEF SUMMARY OF THE INVENTION

Briefly stated, one aspect of the present invention is directed to a device for collecting and releasing debris. The device comprises a collection bin having bottom, left, right and rear panels, an open front end and an open top end. The collection bin defines a collection space therebetween. A top lid covers the top end of the collection bin in a closed position and is movable to an open position uncovering the top end. A stationary front plate is pivotably coupled with the collection bin via a hinge mechanism. The collection bin is rotatable relative to the front plate between a first position, wherein the open front end of the collection bin is closed by the front plate, and a second, open position, wherein the open front end of the collection bin is rotated away from the front plate for releasing debris out of the collection space therethrough. An actuator, located on an opposite side of the stationary front plate from the collection bin, is operatively connected to the hinge mechanism.

The hinge mechanism includes an upper bar interconnected between the collection bin and the front plate. The upper bar is pivotably attached at a front end thereof to the front plate and securely attached at a rear end thereof to the rear panel of the collection bin. Actuation of the actuator rotates the upper bar and the attached collection bin in an arcuate motion from the first position to the second position, and returns the upper bar and attached collection bin in a reverse arcuate motion from the second position to the first position. Rotation of the collection bin between the first and second positions defines a center of rotation located on the opposite side of the stationary front plate from the collection bin, thereby effecting a compact arcuate motion between the first and second positions.

In accordance with another aspect, the present invention is directed to a device for collecting and releasing debris. The device comprises a collection bin having bottom, left, right and rear panels, an open front end and an open top end. The collection bin defines a collection space therebetween. A top lid covers the top end of the collection bin in a closed position and is movable to an open position uncovering the top end. A stationary front plate is pivotably coupled with the collection bin via a hinge mechanism. The collection bin is rotatable relative to the front plate between a first position, wherein the open front end of the collection bin is closed by the front plate, and a second position, wherein the open front end of the collection bin is rotated away from the front plate for releasing debris out of the collection space therethrough. An electrically actuated actuator, located on an opposite side of the stationary front plate from the collection bin, is operatively connected to the hinge mechanism such that reciprocating motion of the actuator translates into rotational motion of the collection bin. A motor is operatively connected to the actuator.

The hinge mechanism includes an upper bar interconnected between the collection bin and front plate. The upper bar is securely attached at a rear end thereof to the rear panel of the collection bin and pivotably attached at a front end thereof to the front plate, thereby defining a pivot axis about which the collection bin pivots. The pivot axis is spaced away from the top end of the collection bin in a direction toward the bottom panel of the collection bin.

Actuation of the actuator rotates the upper bar and attached collection bin in an arcuate motion from the first position to the second position, and returns the upper bar and attached collection bin in a reverse arcuate motion from the second position to the first position. Rotation of the collection bin between the first and second positions defines a center of rotation located on the opposite side of the stationary front plate from the collection bin, thereby effecting a compact arcuate motion between the first and second positions.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "bottom" and "top" designate directions in the drawings to which reference is made. Hereinafter, the terms "proximal" and "rear" are synonyms, as are the terms "distal" and "front." The words "inwardly" and "outwardly" refer to directions toward and away from, respectively, the geometric center of the device, and designated parts thereof, in accordance with the present invention. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein the same reference numerals indicate the same components throughout the figures, there is shown in FIGS. 1-8, a device, generally designated 10, for collecting and releasing debris. In the illustrated embodiment, the device 10 is usable with a grass collecting mowing device 80, such as, for example, without limitation, a riding lawn mower (described further below and shown best in FIG. 8). In such applications, the debris collected and released constitutes predominantly grass and leaf clippings lifted by the blades of the mower 80. However, as should be understood by those of ordinary skill in the art, the device 10 may be usable with numerous other debris collecting and releasing systems that are currently known or later become known.

As shown, the device 10 includes a collection bin 12 having a bottom panel 12a, a left side panel 12b, a right side panel 12c, and a rear panel 12d. In the illustrated embodiment, the rear panel 12d is sloped inwardly, providing an inwardly curved shaped to the rear of the collection bin 12. As shown best in FIGS. 3, 6 and 7, the collection bin 12 has an open front end 12e, and as shown best in FIG. 4, the collection bin 12 has an open top end 12f. The collection bin 12 defines a collection space 12g inside the collection bin 12. A top lid 14 is attached at one end to the open top end 12f of the collection bin 12 to selectively cover or uncover the open top end 12f of the collection bin 12. In the illustrated embodiment, the top lid 14 is hingedly attached to the collection bin 12, adjacent the corner of the collection bin 12 defined by the intersection of the open top end 12f and the open front end 12e. The top lid 14 is movable, e.g., pivotable, between a closed position (e.g., FIGS. 1 and 2), covering the top end 12f, and an open position (FIG. 4), uncovering the top end 12f for access to the collection space 12g inside the collection bin 12. However, as should be understood by those of ordinary skill in the art, the top lid 14 may be attached to the collection bin 12 via any of numerous different conventional methods known in the art, such that the lid 14 is movable between open and closed positions. The top lid 14 also includes at least one vent (not shown) therein for venting air from inside the collection space 12g as debris accumulates within the collection space 12g.

As shown in FIGS. 2-8, the device 10 also includes a stationary front plate 16 adjacent the open front end 12e of the collection bin 12 to selectively open and close the front end 12e of the collection bin 12. The front plate 16 is pivotably coupled with the collection bin 12 via a hinge mechanism 18 (discussed further below). The collection bin 12 is rotatable relative to the stationary front plate 16 between a first position (FIGS. 1, 2, 4, 5, 8), where the open front end 12e of the collection bin 12 engages and is closed by the stationary front plate 16, and a second position (FIGS. 3 and 7), where the open front end 12e of the collection bin 12 is rotated away from the stationary front plate 16, thereby exposing the open front end 12e. As the collection bin 12 rotates away from the stationary front plate 16 and upwardly from a ground surface underneath the device 10 (from the first to the second position), debris, e.g., grass and leaf clippings, within the collection space 12g is released from the collection space 12g through the open front end 12e.

As shown, an actuator 20 is located on an opposite side of the stationary front plate 16 from the collection bin 12, i.e., on the front side of the stationary front plate 16. The actuator 20 is operatively connected to the hinge mechanism 18, such that actuation of the actuator 20 causes rotation of the hinge mechanism 18, and therefore rotates the collection bin 12 between the first and second positions. The actuator 20 may be electrically actuated or mechanically actuated. Alternatively, the actuator 20 may be both electrically and mechanically actuated, such that the mechanical actuation of the actuator 20 operates as a fail safe mechanism should electrical actuation fail. Where the actuator 20 is electrically actuated, the device 10 also includes a motor 22 operatively connected to the actuator 20 for actuating the actuator 20. Where the actuator is mechanically actuated, the device 10 also includes a lever (not shown), connected to the actuator 20, or directly to the hinge mechanism 18, for actuation. In the illustrated embodiment, the actuator 20 is at least one and preferably two pistons, each having a piston rod 20a movable in reciprocating motion into and out of a piston cylinder 20b. As should be understood by those of ordinary skill in the art, where the actuator 20 is electrically actuated, the motor 22 drives the advancement or retraction of the piston rod(s) 20a into and out of the piston cylinder(s) 20b via hydraulic, pneumatic or any other means of pressure in a manner well known in the art. However, as also should be understood by those of ordinary skill in the art, any of numerous different actuators, capable of performing the functions of the actuator 20 as described herein, may alternatively be utilized.

Figure 1:
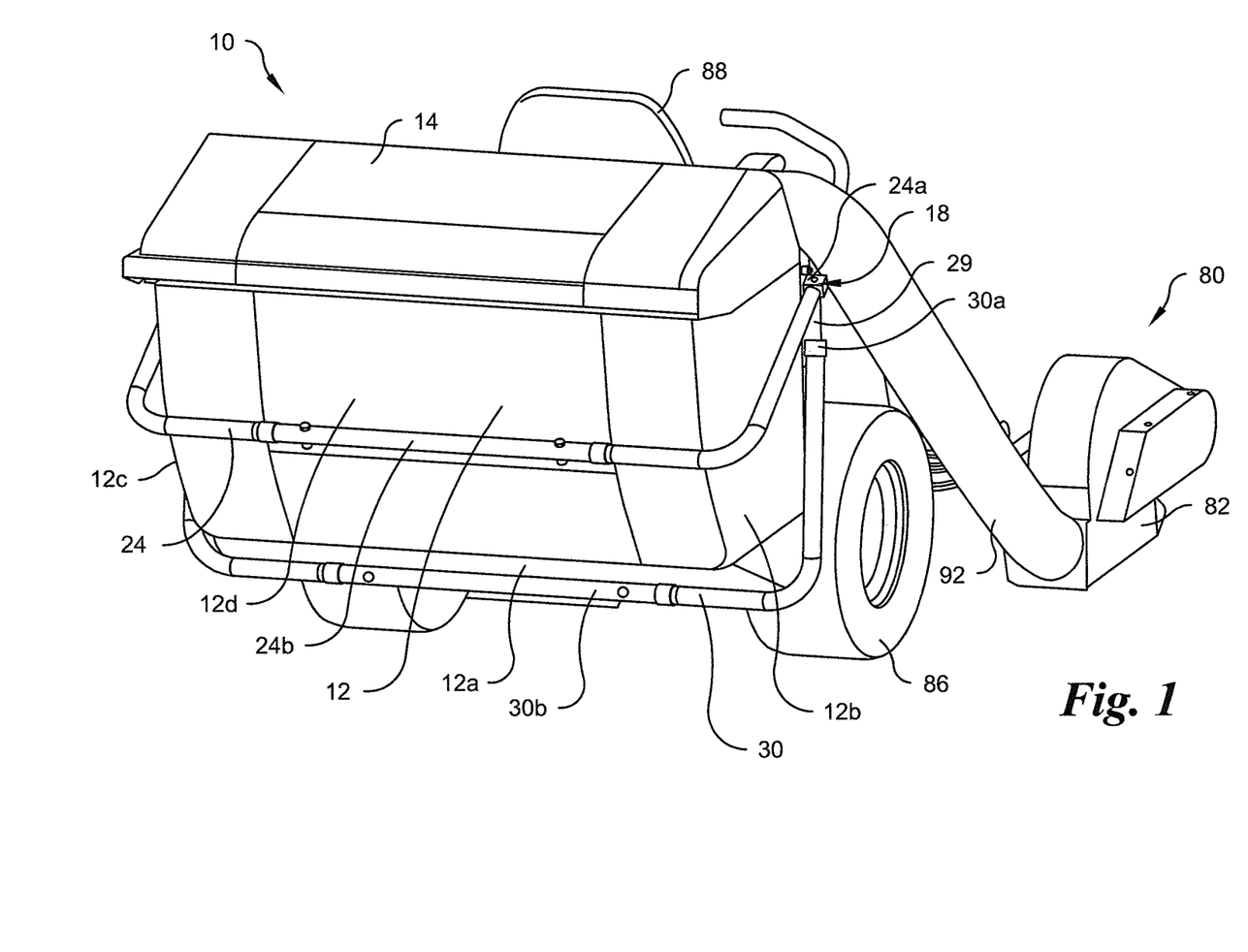
FIG. 1 is a perspective rear view of a device for collecting and releasing debris in accordance with a preferred embodiment of the present invention, assembled to a partially depicted mowing device.
Figure 2:
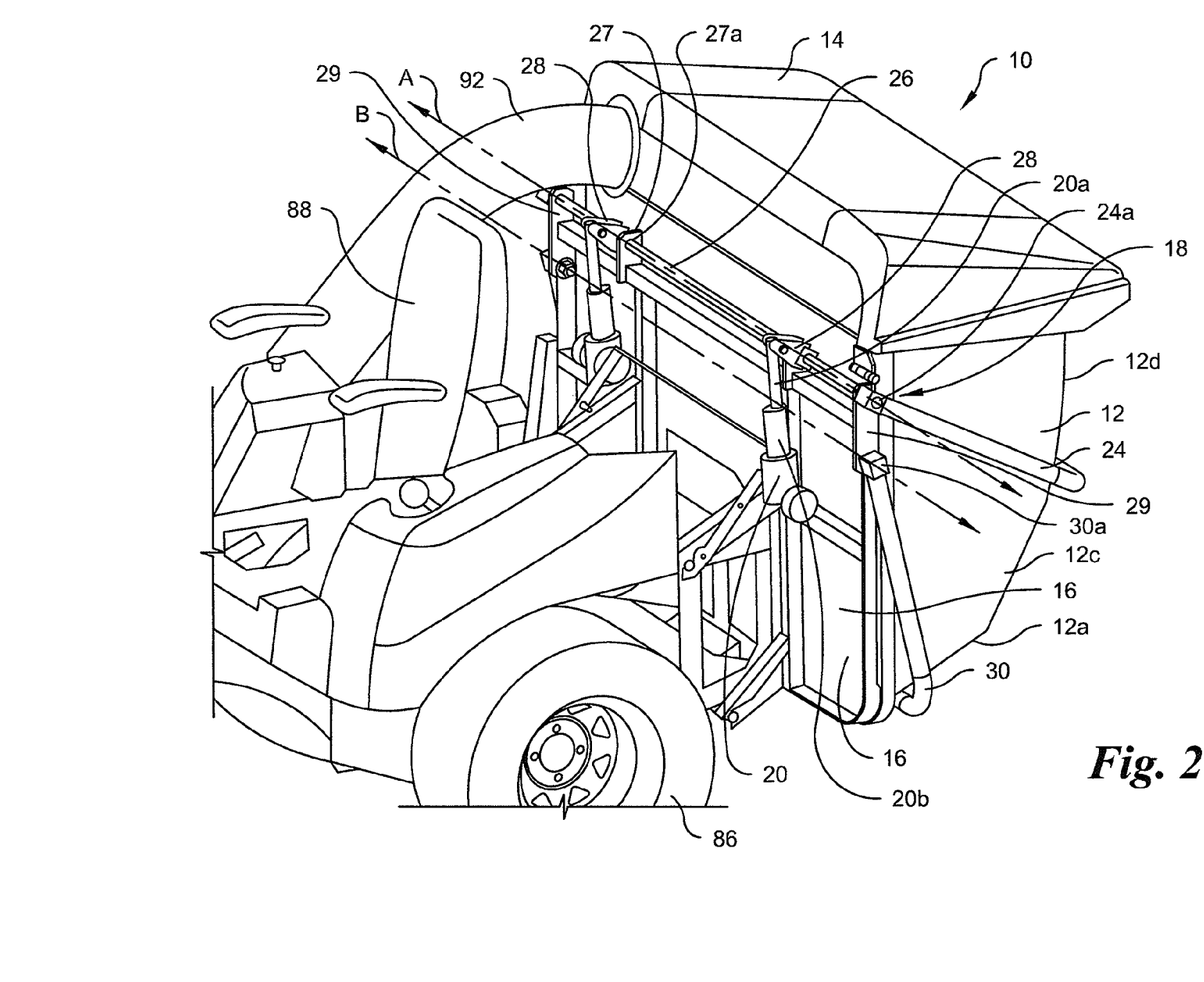
FIG. 2 is a front perspective view of the device of FIG. 1, assembled to a rear end of a partially depicted mowing device, with a collection bin of the device for collecting and releasing debris in a first, collecting position.
Figure 3:
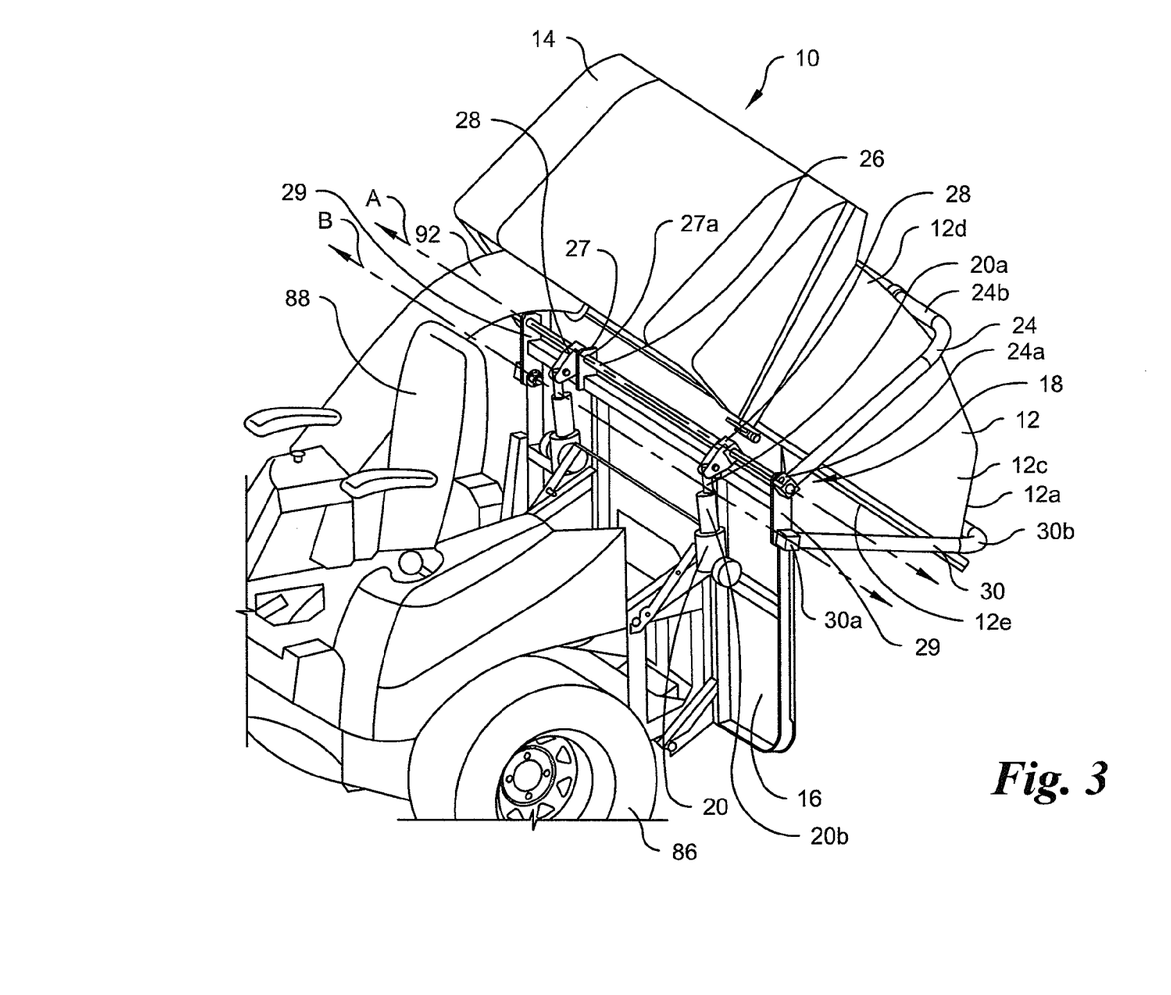
FIG. 3 is a front perspective view of the device of FIG. 1, assembled to the rear end of a partially depicted mowing device, with the collection bin in a second, dumping position.
Figure 4:
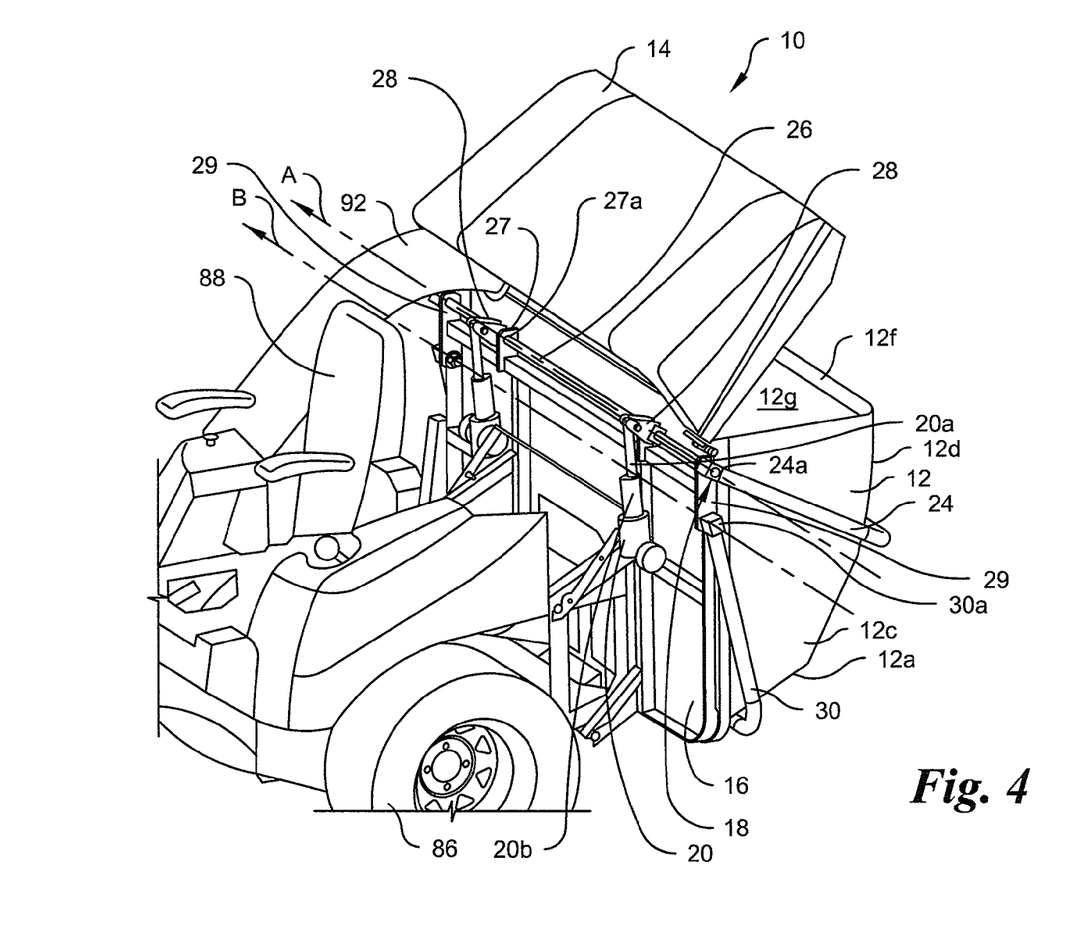
FIG. 4 is a front perspective view of the device of FIG. 1, assembled to the rear end of a partially depicted mowing device, with the collection bin in the first position, and with a top lid of the device for collecting and releasing debris in an open position.

As shown best in FIGS. 2-4, the hinge mechanism 18 includes at least an upper bar 24 interconnected between the collection bin 12 and the stationary front plate 16. As shown, the upper bar 24 is positioned about the left, right and rear panels, 12b, 12c, 12d, of the collection bin 12. The upper bar 24 is rotatably attached at front ends 24a to brackets 29 of the front plate 16 located at opposing sides of the front plate 16. As shown best in FIG. 1, the upper bar 24 is also securely attached at a rear end 24b to the rear panel 12d of the collection bin 12 near the vertical center. As should be understood by those of ordinary skill in the art, the upper bar 24 may be rotatably attached to the stationary front plate 16 and securely attached to the collection bin 12 via any of numerous different conventional attachment means known in the art, such as via screws, nuts, and bolts. Actuation of the actuator 20 rotates the upper bar 24 and the attached collection bin 12 in an arcuate motion from the first position (e.g., FIG. 5) to the second position (e.g., FIG. 7), and returns the upper bar 24 and the collection bin 12 in a reverse arcuate motion from the second position to the first position.

As also shown in FIGS. 2-4, the hinge mechanism 18 also includes a generally cylindrical attachment bar 26, positioned in front of the stationary front plate 16, i.e., on the opposite side of the front plate 16 from the collection bin 12, and extending generally parallel to the stationary front plate 16 between opposing left and right sides of the front end 24a of the upper bar 24. One or more brackets 27 securely attached to the stationary front plate 16 and having circular openings 27a extending therethrough support the attachment bar 26, extending through the openings 27a, on the front plate 16 while allowing the attachment bar 26 to rotate. The attachment bar 26 is fixedly secured to the left and right sides of the front end 24a of the upper bar 24, such that rotation of the attachment bar 26 rotates, i.e. pivots, the upper bar 24, and therefore rotates the attached collection bin 12 relative to the stationary plate 16. The attachment bar 26 defines a pivot axis A about which the upper bar 24 and the collection bin 12 pivot. The hinge mechanism 18 further includes at least one bell crank 28 (two bell cranks 28 in the illustrated embodiment) connecting the actuator 20 with the attachment bar 26. The bell crank 28 is fixedly attached at one end to the attachment bar 26. Therefore, rotation of the bell crank 28 will also rotate the attachment bar 26. The bell crank 28 is pivotably attached at the opposite end to the actuator 20. In the illustrated embodiment, the bell crank 28 is pivotably attached to the piston rod 20a of each piston 20. Accordingly, and as shown between FIGS. 2 and 3, and between FIGS. 5-7, reciprocating upward and downward movement of the piston rod(s) 20a out of and into the piston cylinder 20b pivots the bell crank 28 and the attachment bar 26 about the pivot axis A. Thus, the reciprocating motion of the piston rod(s) 20a is translated into rotational motion of the attachment bar 26, the attached upper bar 24, and the attached collection bin 12.

As shown, the pivot axis A is spaced away from the top end 12f of the collection bin 12 (and from the top lid 14), in a direction toward the bottom panel 12a. Because the pivot axis A is spaced from the top end 12f of the collection bin 12, the collection bin 12 does not pivot about the top end 12f of the collection bin 12. Instead, the collection bin 12 pivots about the axis A spaced from the top end 12f so that the center of rotation of the collection bin 12 is located on the front side of the stationary front plate 16, thereby effecting a compact arcuate motion between the first and second positions of the collection bin 12, as shown when viewing FIGS. 5-7.

Figure 7:
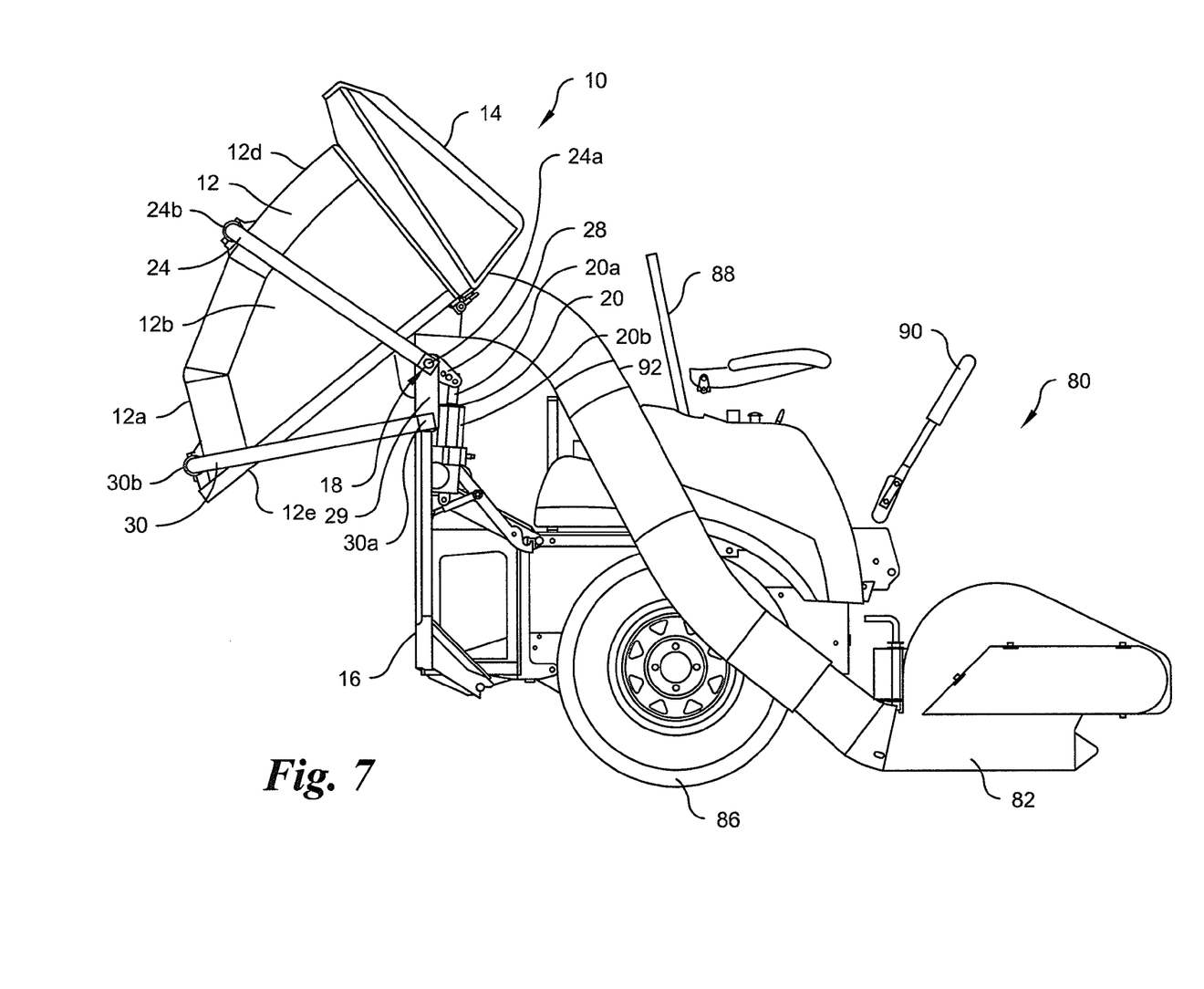
FIG. 7 is a side elevational view of the device of FIG. 1, assembled to the rear end of a mowing device, with the collection bin in the second position.

As shown in FIGS. 1, 2, 4, 5 and 8 and mentioned above, the entirety of the collection bin 12 is located on the rear side of the stationary front plate 16, i.e., the side of the front plate 16 opposite the actuator 20, in the first position. In the first position, the open front end 12e is parallel to, and closed by, the front plate 16. Due to the location of the pivot axis A, however, and as shown in FIGS. 3 and 7, at least a portion of the collection bin 12 is elevated above the stationary front plate 16 and at least a portion of the collection bin 12 is positioned on the front side of the stationary front plate 16, i.e., on the same side of the front plate 16 as the actuator 20, in the second position.

The location of the pivot axis A in the illustrated embodiment results in a center of rotation located within the range of about 6 inches to about 12 inches in front of the stationary front plate 16. Accordingly, the radius of rotation of the collection bin 12, measured from the location of the pivot axis A along the stationary front plate 16 to the farthest point along the rear panel 12d of the collection bin 12, is small, resulting in the compact arcuate motion of the collection bin 12. The reduced radius of rotation associated with the compact arcuate motion of the collection bin 12 enables dumping of debris in the collection space 12g of the collection bin 12 in a more confined space, i.e., a more compact debris pile, rather than dumping the debris over a larger area. Further, the reduced radius of rotation associated with the compact arcuate motion of the collection bin 12, along with the shape of the rear panel 12d, also reduces the clearance space necessary behind the collection bin 12 in order to rotate the collection bin 12 between the first and second positions.

In the illustrated embodiment, the hinge mechanism 18 also includes a lower bar 30, located beneath the upper bar 24, and also interconnected between the collection bin 12 and the stationary front plate 16. As shown, the lower bar 30 is positioned about the left, right and bottom panels 12b, 12c, 12a, of the collection bin 12. Similarly to the upper bar 24, the lower bar 30 is rotatably attached at front ends 30a to the brackets 29 of the front plate 16, beneath the attachment of the upper bar 24 to the brackets 29. The lower bar 30 is securely attached at a rear end 30b of the lower bar 30 to the bottom panel 12a of the collection bin 12. As should be understood by those of ordinary skill in the art, and similarly to the upper bar 24, the lower bar 30 may be rotatably attached to the stationary front plate 16 and securely attached to the collection bin 12 via any of numerous different conventional attachment means known in the art. In some embodiments, the actuator 20 may be operatively connected to the lower bar 30, instead of, or in addition to, the actuator's connection to the upper bar 24, in similar manner as described herein with respect to the connection between the actuator 20 and the upper bar 24.

The front end 30a of the lower bar 30 defines a pivot axis B, about which the lower bar 30 pivots between the first and second positions of the collection bin 12. The pivot axis B is parallel to, and extends along the same vertical plane as, the pivot axis A. The pivot axis B is spaced beneath the pivot axis A by substantially the same distance as the front ends 30a of the lower bar 30 are located beneath the front ends 24A of the upper bar 24. Thus, actuation of the actuator 20, i.e., extension of the piston rod(s) 20a, rotates the upper bar 24 and the lower bar 30 (which rotates as the bin moves) to rotate the collection bin 12 in an arcuate motion from the first position (e.g., FIG. 5) to the second position (e.g., FIG. 7), and retraction of the piston rod(s) 2a returns the upper bar 24, the lower bar 30 and the collection bin 12 in a reverse arcuate motion from the second position to the first position. The lower bar 30 operates to further support the collection bin 12 in the first position and when the collection bin 12 is rotated between the first and second positions.

Figure 8:
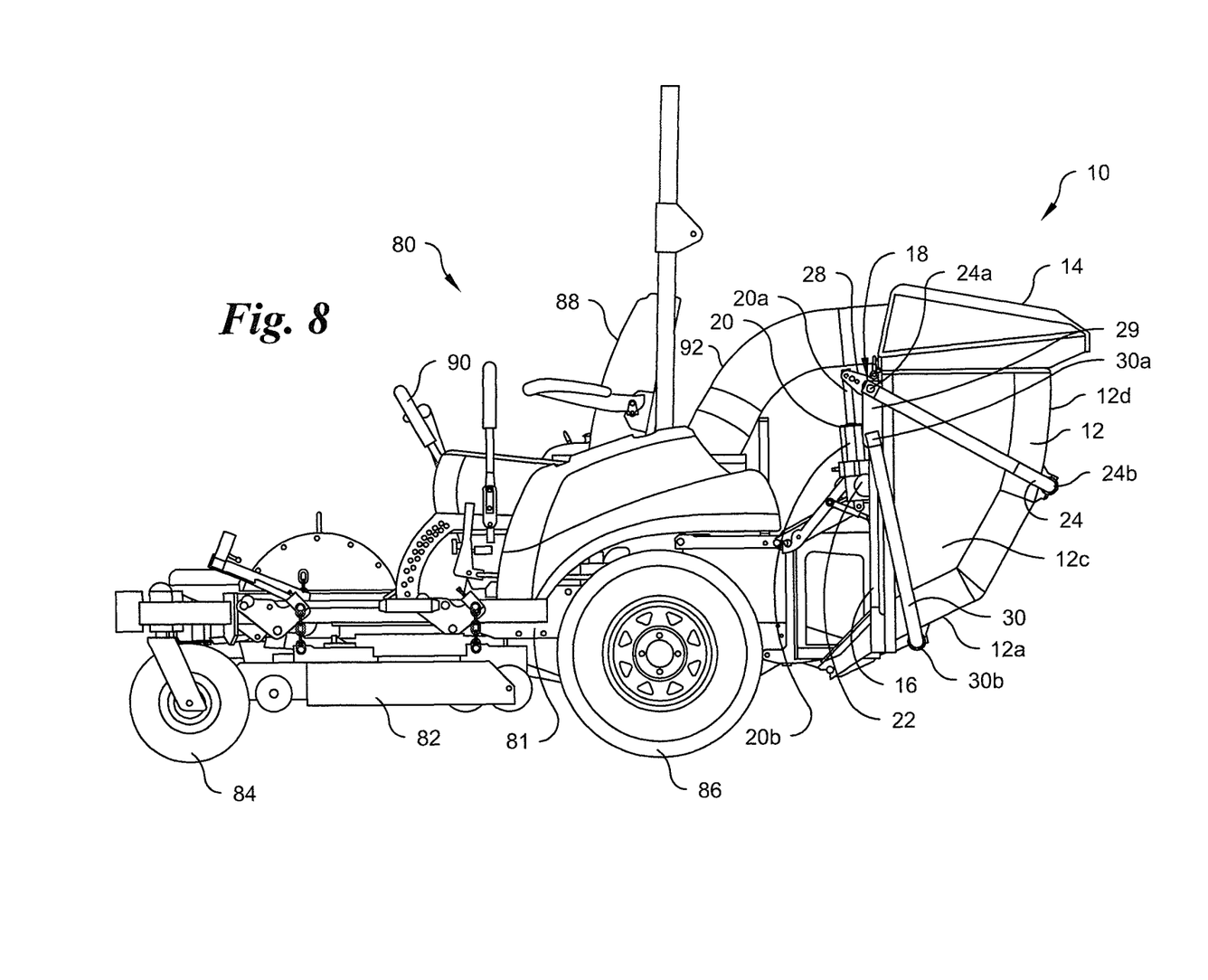
FIG. 8 is an opposing side elevational view of the device of FIG. 1, assembled to the rear end of a mowing device, with the collection bin in the first position.

As mentioned previously, the device 10 is usable with a grass collecting mowing device 80, such as, for example, without limitation, a riding lawn mower. As shown in FIG. 8, a typical riding lawn mower 80 includes a frame 81, a mower deck 82 supported on the frame 81 and enclosing one or more rotating blades (not shown) for cutting grass, a pair of front wheels 84, supported on the frame 81, for steering, and a pair of rear wheels 86 supported on the frame 81 and drivingly connected to a motor (not shown) for propulsion of the mower 80. A user, sitting on a seat 88 supported by the mower deck 82, controls the operation of the mowing device 80 via user controls 90. User controls 90 may include a variety of controls, as known in the art, such as, for example, without limitation, controls for navigating the mower 80, control for selecting the cutting height of the rotating blades, controls for selecting the speed of propulsion of the rear wheels 86, and controls for movement of the collection bin 12 between the first and second positions to release debris from the collection space 12g. The device 10 for collecting and releasing debris is generally securely assembled to a rear end of the mowing device 80. The collection space 12g of the collection bin 12 is operatively connected to an interior of the mower deck 82 by a tube or chute 92.

In operation, when the rotating blades cut grass, grass clippings are propelled by the blade(s) from the interior of the mower deck 82, through the tube 92 and into the collection space 12g of the collection bin 12 of the device 10. As the grass clippings accumulate in the collection space 12g the user may wish, or need, to empty the collection bin 12. A user may lift the top lid 14 to see the level of accumulation of the grass clippings to assess whether dumping of the debris is necessary. Once a user decides to empty the collection space 12g, and in embodiments having an electrically actuated actuator 20, a user may selectively actuate the motor 22 operatively connected to the actuator 20, while sitting in the seat 88. Alternatively, in embodiments having a mechanically actuated actuator 20, a user may actuate one or more levers extending from a point proximate to the seat 88 to at least the actuator 20 or the hinge mechanism 18, to allow the user to manually move the collection bin 12, while sitting in the seat 88.

Figure 5:
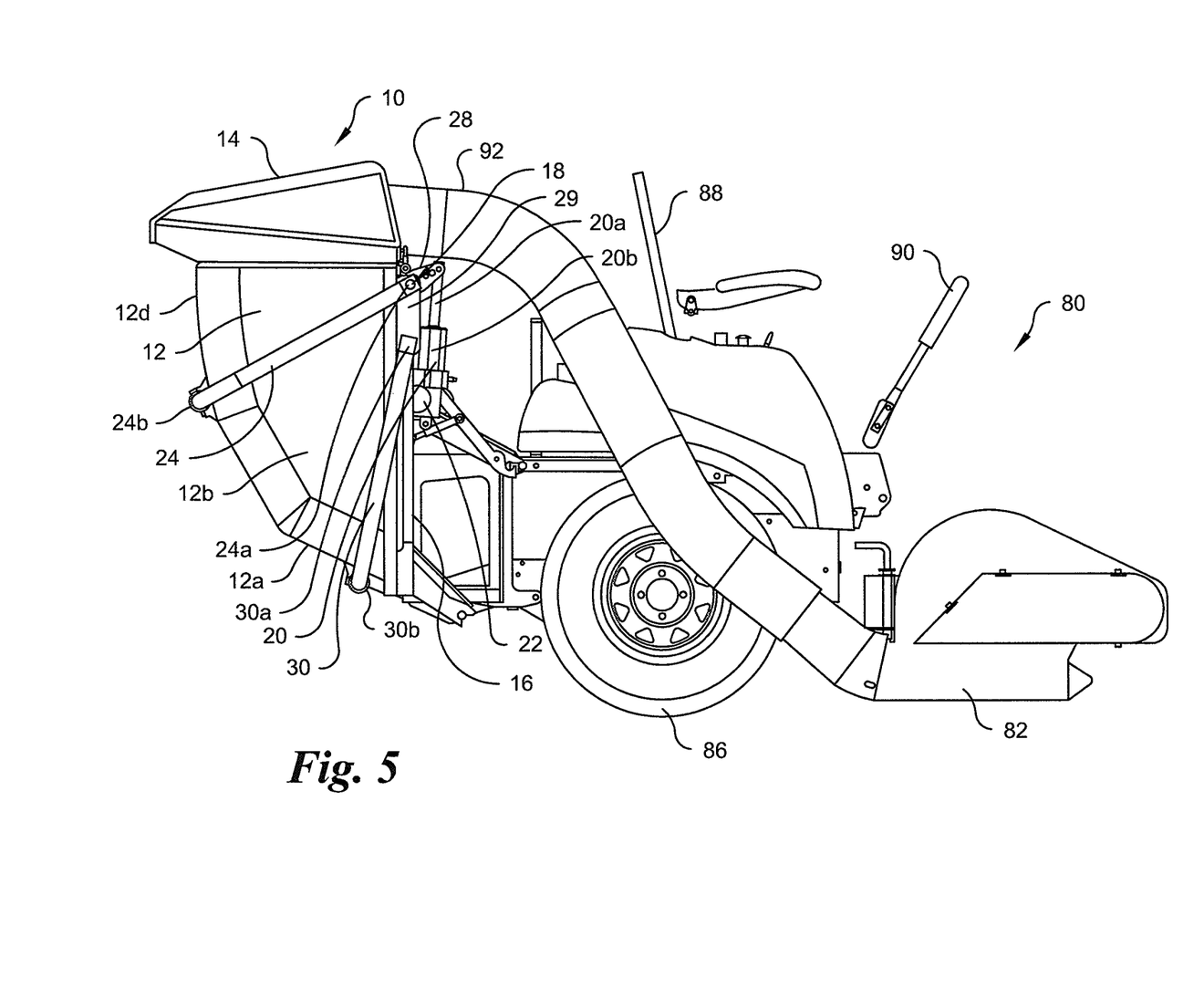
FIG. 5 is a side elevational view of the device of FIG. 1, assembled to the rear end of a mowing device, with the collection bin in the first position.
Figure 6:
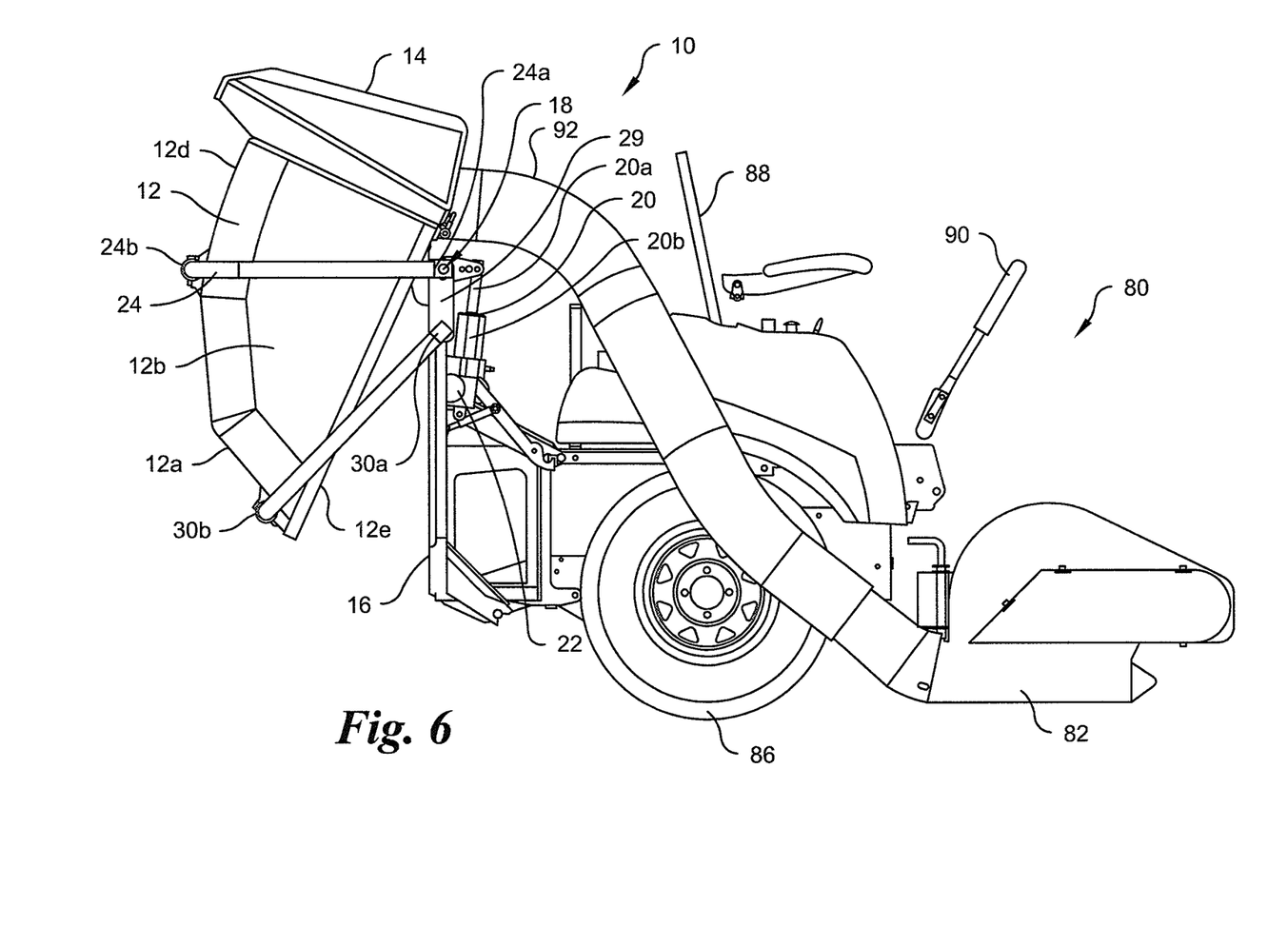
FIG. 6 is a side elevational view of the device of FIG. 1, assembled to the rear end of a mowing device, with the collection bin in rotation between the first and second positions.

As discussed above, and as shown between FIGS. 5-7, the linear motion of the actuator 20, i.e., advancing the piston rod(s) 20a into the piston cylinder(s) 20b, pivots the bell cranks 28, and the attachment bar 26 fixedly attached to the bell cranks 28, about the pivot axis A, such that the upper bar 24, along with the lower bar 30 (rotating about the pivot axis B), move the collection bin from the first position (FIG. 5), in a compact arcuate motion, to the second position (FIG. 7), to expose the open front end 12e of the collection bin 12, allowing the grass clippings to fall out of the collection space 12g through the open front end 12e. Thereafter, once the collection space 12g has been emptied, a user may actuate the motor 22 or the lever(s) (not shown) to retract the piston rod(s) 20a from the piston cylinder(s) 20b, pivoting the bell cranks 28 and the attachment bar 26 about the pivot axis A, in the opposite direction. Accordingly, the upper bar 24, along with the lower bar 30 (rotating about the pivot axis B), move the collection bin 12 from the second position (FIG. 7) in a compact arcuate motion, back to the first position (FIG. 5.).

The compact arcuate motion of the container bin 12 permits movement of the collection bin 12 between the first and second positions in tighter areas. Therefore, should a user wish to dump the debris, such as grass clippings, close to a wall, or any other object, a user can get close to the object itself and dump the debris close to the object, because less clearance is required than prior art collection bins to allow the collection bin 12 to rotate between the first and second positions. The compact arcuate motion of the container bin 12 also allows the debris to be piled more compactly.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A mowing device in combination with a collecting device positioned at a rear end thereof, wherein the mowing device comprises:
    a frame;
    a mower deck, supported by the frame, enclosing rotating blades;
    a pair of front wheels, supported by the frame, for steering;
    a pair of rear wheels, supported by the frame, for propulsion;
    a seat, supported by the frame; and
    a tube connected from the interior of the mower deck to the collecting device, such that debris collected in the mower deck flows from the interior of the mower deck, through the tube and into the collecting device;
    wherein the collecting device comprises:
    a collection bin having bottom, left, right and rear panels, an open front end and an open top end, and defining a collection space therebetween;
    a top lid covering the top end of the collection bin in a closed position and movable to an open position uncovering the top end;
    a stationary front plate pivotably coupled with the collection bin via a hinge mechanism, such that the collection bin is rotatable relative to the front plate between a first position, wherein the open front end of the collection bin is closed by the front plate, and a second, open position, wherein the open front end of the collection bin is rotated away from the front plate for releasing debris out of the collection space therethrough; and
    an actuator, located on an opposite side of the stationary front plate from the collection bin and operatively connected to the hinge mechanism;
    wherein:
        the hinge mechanism includes an upper bar interconnected between the collection bin and front plate, the upper bar being securely attached at a rear end thereof to the rear panel of the collection bin and pivotably attached at a front end thereof to the front plate, defining a first pivot axis about which the upper bar and the collection bin pivot, and a lower bar located beneath the upper bar and positioned about the left, right and rear panels of the collection bin, the lower bar being securely attached at a rear end thereof to the bottom panel of the collection bin and pivotably attached at a front end thereof to the front plate, defining a second pivot axis, spaced beneath the first pivot axis, about which the lower bar and the collection bin pivot; and actuation of the actuator rotates the upper bar about the first pivot axis, the lower bar about the second pivot axis and the attached collection bin about both the first and second pivot axes in an arcuate motion from the first position to the second position, and returns the upper and lower bars and attached collection bin in a reverse arcuate motion from the second position to the first position.

2. The combination as defined in claim 1, wherein the hinge mechanism further comprises a bell crank attached at one end thereof to the upper arm along the first pivot axis of the upper arm, and attached at an opposing end thereof to the actuator, such that reciprocating motion of the actuator translates into rotational motion of the upper bar and attached collection bin.

3. The combination as defined in claim 1, wherein the first pivot axis is spaced away from the top end of the collection bin in a direction toward the bottom panel thereof.

4. A device as defined in claim 3, wherein in the first position, the entirety of the collection bin is located on the side of the stationary front plate opposite the actuator and the open front end of the collection bin is parallel to, and closed by, the front plate, and in the second position, at least a portion of the collection bin is elevated above the front plate and at least a portion of the collection bin is positioned on the same side of the front plate as the actuator.

5. The combination as defined in claim 1, wherein the moving device comprises a riding lawn mower, and the debris comprises grass and leaves.

6. The combination as defined in claim 1, wherein the mowing device further comprises user controls configured at least for controlling movement of the mowing device, controlling cutting height of the rotating blade, and moving the collection bin between the first and second positions.

7. A mowing device in combination with a collecting device positioned at a rear end thereof, wherein the mowing device comprises:
   a frame;
   a mower deck, supported by the frame, enclosing rotating blades;
   a pair of front wheels, supported by the frame, for steering;
   a pair of rear wheels, supported by the frame, for propulsion;
   a seat, supported by the frame; and
   a tube connected from the interior of the mower deck to the collecting device, such that debris collected in the mower deck flows from the interior of the mower deck, through the tube and into the collecting device;
   wherein the collecting device comprises:
   a collection bin having bottom, left, right and rear panels, an open front end and an open top end, and defining a collection space therebetween;
   a top lid covering the top end of the collection bin in a closed position and movable to an open position uncovering the top end;
   a stationary front plate pivotably coupled with the collection bin via a hinge mechanism, such that the collection bin is rotatable relative to the front plate between a first position, wherein the open front end of the collection bin is closed by the front plate, and a second position, wherein the open front end of the collection bin is rotated away from the front plate for releasing debris out of the collection space therethrough;
   an electrically actuated actuator, located on an opposite side of the stationary front plate from the collection bin and operatively connected to the hinge mechanism, such that reciprocating motion of the actuator translates into rotational motion of the collection bin; and
   a motor operatively connected to the actuator;
   wherein:
      the hinge mechanism includes an upper bar interconnected between the collection bin and front plate, the upper bar being securely attached at a rear end thereof to the rear panel of the collection bin and pivotably attached at a front end thereof to the front plate, thereby defining a first pivot axis about which the upper bar and the collection bin pivot, said first pivot axis being spaced away from the top end of the collection bin in a direction toward the bottom panel thereof, and the hinge mechanism includes a lower bar located beneath the upper bar and positioned about the left, right and rear panels of the collection bin, the lower bar being securely attached at a rear end thereof to the bottom panel of the collection bin and pivotably attached at a front end thereof to the opposing ends of the front plate, defining a second pivot axis, spaced beneath the first pivot axis, about which the lower bar and the collection bin pivot, and
      actuation of the actuator rotates the upper bar about the first pivot axis, the lower bar about the second pivot axis and the attached collection bin about both the first and second pivot axes in an arcuate motion from the first position to the second position, and returns the upper and lower bars and attached collection bin in a reverse arcuate motion from the second position to the first position.

8. The combination as defined in claim 7, wherein in the first position, the entirety of the collection bin is located on the side of the stationary front plate opposite the actuator and the open front end of the collection bin is parallel to, and closed by, the front plate, and in the second position, at least a portion of the collection bin is elevated above the front plate and at least a portion of the collection bin is positioned on the same side of the front plate as the actuator.

* * * * *